Oct. 21, 1958 D. STERN 2,857,128
SAFETY SHUTOFF COUPLING
Filed Oct. 18, 1956 2 Sheets-Sheet 1
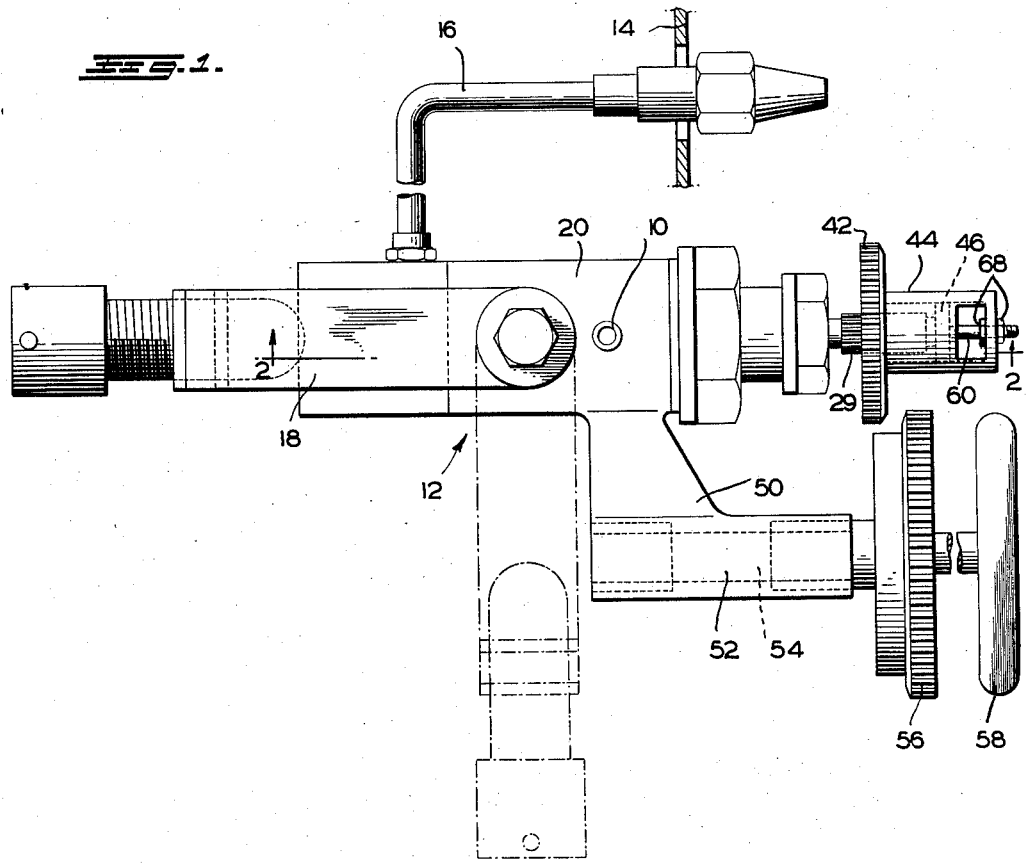
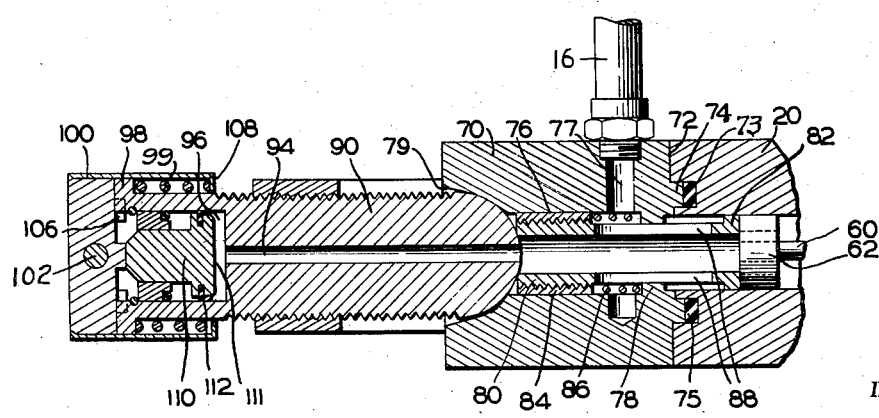
INVENTOR
DANIEL STERN
BY
B. L. Zangwill
ATTORNEY

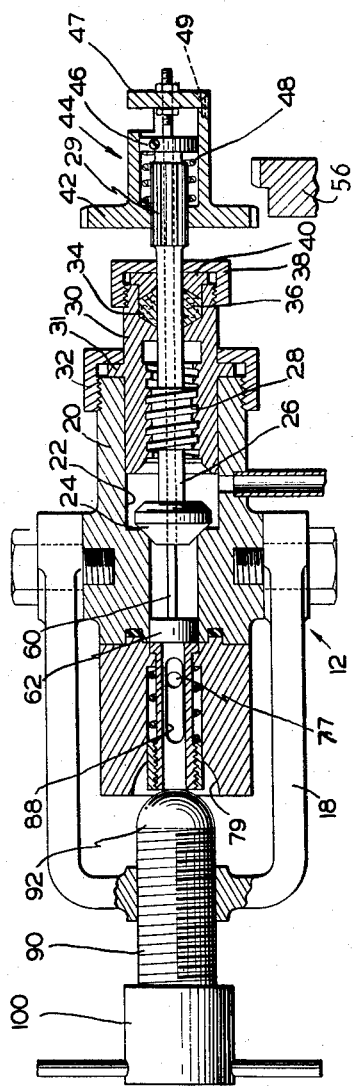
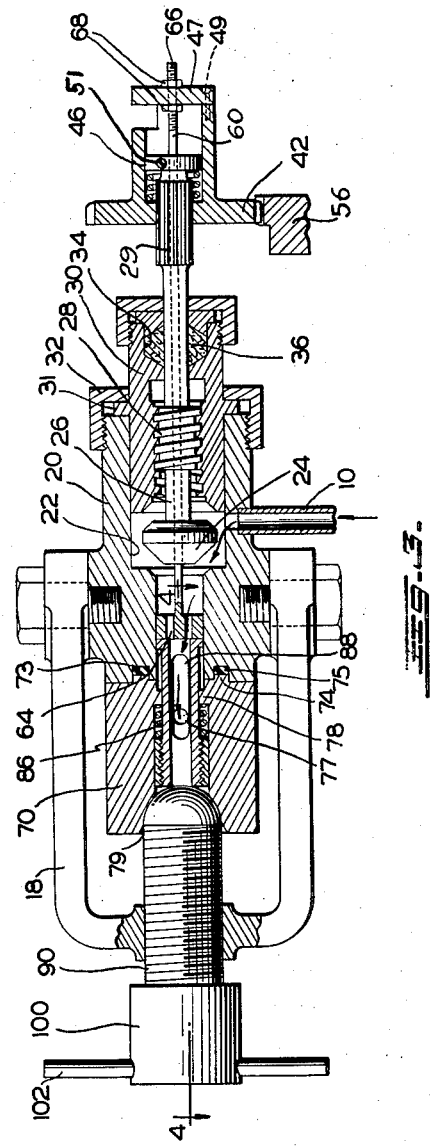

United States Patent Office 2,857,128
Patented Oct. 21, 1958

2,857,128

SAFETY SHUTOFF COUPLING

Daniel Stern, Silver Spring, Md.

Application October 18, 1956, Serial No. 616,900

3 Claims. (Cl. 251—151)

(Granted under Title 35, U. S. Code (1952), sec. 266)

The invention described herein may be manufactured and used by or for the Government of the United States of America for governmental purposes without the payment of any royalties thereon or therefor.

This invention relates to a fuel oil burner safety device and more particularly to a safety shutoff coupling used in a pressurized fuel system wherein fuel is either permitted or prevented from flowing therethrough according to a preselected position of the coupling in the apparatus.

The fuel oil piping installations utilized on ships for providing preheated, high pressure oil to burners terminate in a plurality of end sections of pipe, or atomizers, which spray the fuel oil into the burner. The burner provides heat for generating steam which ultimately is used for driving turbines on the ship.

An unusual characteristic of this type of fuel system is that when there is a major demand for a change in the ship's speed, the atomizers for each burner must be changed to supply a corresponding amount of fuel to the burner thereby resulting in an increase or decrease in steam pressure for achieving the desired speed change. The design of the system is such that a valve in the fuel supply line must be turned to a closed position when atomizers of one size are changed for those of a different size, so as to preclude the spraying of hot, high pressure oil into the compartment housing the equipment.

The prior art discloses apparatus wherein an atomizer is held in place by a bolt and yoke arrangement, and a separately operative control valve is utilized for controlling the flow of fuel to the atomizer. The disadvantages of this type of installation is that an atomizer may be removed accidentally while the control valve is open thereby permitting the hot oil to spray into the compartment with consequent destruction of equipment by fire and/or injury to personnel maintaining and operating such equipment. Further, in the event that an atomizer is not in position, the control valve may be opened allowing flow of fuel into the compartment under full line pressure thereby causing the destruction described above.

It is therefore an object of the invention to provide a safety coupling for effectively eliminating the hazards now present in fuel supply systems.

Another object of the invention is to provide a safety device for preventing the removal of an end section of pipe or atomizer, located in a high pressure fuel line while said fuel is under pressure.

Still another object of the invention is to provide a fluid-carrying supply line that is adapted to have either an end section of pipe or an atomizer connected to an end thereof, with means adapted to prevent the flow of fluid through said line when either said end section of pipe, or atomizer, as the case may be, is not connected to said supply line.

A further object of the invention is to provide a safety coupling having a pressure-operative releasing device, in a fluid supply system having a main fluid control valve, said coupling being adapted to prevent release of an atomizer or the like when the main control valve is in an open position.

An additional object of the invention is to provide a safety coupling for connecting a main fluid supply line having a valve therein, to either the end of a pipe or to an atomizer; said coupling being adapted to render said valve inoperative when the pipe-end or atomizer is disconnected from said main fluid supply line.

In accordance with this invention a fluid supply line for carrying fuel or the like, is provided with a combination end coupling and valve means. The coupling is adapted to be connected to another pipe line or to an atomizer or the like. A valve means and coupling member combine in such a manner as to prevent accidental discharge of fluid such as oil or the like from the high pressure fluid supply line in the event that the end of said line is not connected to either the end of a pipe or an atomizer.

The assembly comprises a hollow valve housing having a U-shaped member pivotally attached thereto, the leg portions of the U-shaped member being pivotally attached to opposite sides of the valve housing. The bight portion of the U-shaped member is provided with a pressure operated bolt threaded therein, said bolt being commonly known as a Wilson bolt, an example of which is disclosed in the United States Patent to Stanley N. Dunton, No. 2,670,099, issued February 23, 1954. The pivotally mounted U-shaped member and bolt are so arranged that the bolt is adapted to be juxtaposed opposite the discharge end of the valve housing, said bolt being adapted to hold a coupling member located at the inlet end of an atomizer or the like against the discharge opening of the valve, so that oil may flow through the valve, into the coupling member and thence through the atomizer itself. The valve is provided with a hand-driven gear means for opening and closing said valve. The gear-driven valve operating means is operable only when the atomizer coupling portion is in abutting relation with the discharge end of the valve, and the pressure-operated bolt is tightly screwed against that side of said atomizer coupling portion that is opposite the discharge opening in the valve.

Other objects and many of the attendant advantages of this invention will be readily appreciated as the same becomes better understood, by reference to the following detailed description when considered in connection with the accompanying drawings wherein:

Fig. 1 is a side view, in elevation, of a fuel supply system for a burner including a safety shutoff coupling, the parts in solid lines illustrating the device in an operative position;

Fig. 2 is a plan view, in section, taken on line 2—2 of Fig. 1, and showing the apparatus in partially assembled condition;

Fig. 3 is a sectional view similar to Fig. 2, showing the apparatus in a completely assembled and operative condition, the valve being open; and Fig. 4, taken on line 4—4 of Fig. 3, is a sectional view of an atomizer coupling and pressure-operated bolt, said assembly being shown in operative condition, and drawn to a larger scale than in Fig. 3.

Referring now to the drawings wherein like reference characters designate like or corresponding parts throughout the several views, there is illustrated in Fig. 1, the general organization of the invention, the solid lines showing the parts in an operative position while the dotted lines show the inoperative position of the parts. The apparatus comprises a fuel supply pipe 10 providing fuel to a safety shutoff coupling 12. Interconnected between the coupling 12 and a burner 14 is a removable atomizer 16 which is utilized for supplying fuel to the burner, The atomizer is removably attached to coupling 12 by an adjustable bolt in a pivotally mounted yoke 18.

It is pointed out that the safety shutoff coupling 12 includes a valve housing 20 having the fuel supply pipe 10 connected thereto in any suitable manner. A passageway 22 is provided within the housing 20; said passageway extending the length of the housing, and communicating with the pipe 10. The passageway 22 is opened and closed by a manually operated screw-type valve 24 affixed to an end of a valve stem 26 that is provided with external screw threads 28 intermediate its ends. The outer extremity of the valve stem 26 is provided with a splined portion 29 for a purpose hereinafter described.

The valve stem 26 passes through an internally threaded, cylindrically-shaped valve stem holder 30, the threaded portion 28 of the valve stem 26 being enmeshed with the internally threaded portion of the valve stem holder 30. Intermediate its ends, the valve stem holder 30 is provided with an outwardly extending flange 31 adapted to abut the outer extremity of the valve housing 20. The valve stem holder 30 is held in place by means of a locking nut 32 screwed onto the outer extremity of the valve housing 20, said nut 32 holding the flange 31 in abutting relation with the outer extremity of the valve housing 20. The outer extremity of the stem holder 30 is provided with a countersunk portion 34 of larger diameter than that of the valve stem. A packing gland 36 is held within the countersunk portion 34 and is pressed against said valve stem by means of a locking nut 38 which surrounds the valve stem and is screwed on to the exterior of the valve stem holder 30; said lock nut pressing a bushing 40, which surrounds the valve stem, against the packing gland 36, thereby preventing leakage of oil past the valve stem 26 to the exterior of the housing 20.

A gear member 42 is slidably mounted on the splined portion 29 at the outer extremity of the valve stem 26. The gear 42 is provided with a hollow enclosure 44 that is immovably affixed to that side of the gear that faces away from the valve housing 20. The hollow housing 44 is provided with a cut away portion and the end of said housing is covered with a removable cap member 47, held in place by suitable screws 49. At least a portion of the splined section 29 of the valve stem extends within said hollow enclosure 44. The outer end of the valve stem, beyond the splined portion thereof, has a disc 46 affixed thereto by means of a set screw 51. A coil spring 48 surrounds the splined portion of the stem that is contained within the hollow enclosure 44, and is compressibly located between the disc 46 and the outer face of the gear 42. Since the spring 48 is normally under compression between the disc 46 and the gear 42, said spring will tend to move the gear towards the valve housing 20.

The valve housing 20 is provided with an extension member 50 extending laterally therefrom, said extension member having a hollow bearing 52 at one end thereof. The bearing 52 has a rotatable shaft 54 mounted therein, said shaft being parallel to the valve stem 26. The shaft 54 has a gear 56 fixedly mounted at the right-hand end thereof, as viewed in Fig. 1. The gear 56 is adapted to be rotated by means of a handle 58 mounted on an extension of shaft 54. The gear 42 is adapted to mesh with gear 56 in a manner hereinafter described, and when gears 42 and 56 are enmeshed, the rotation of handle 58 of course causes rotation of gear 42.

The valve stem 26, above referred to, is provided with a bore extending axially thereof from one end to the other. A rod 60 is slidably carried within the bore provided in the stem 26, said rod being considerably longer than the valve stem 26 and extending beyond each of its ends. At the end of said rod 60 that is located within the valve housing 20, a piston-like member 62 is affixed thereto. The piston-like member 62 is provided with a series of holes 64 extending completely therethrough, each of said holes 64 being in communication with that portion of the passageway 22 located at each side of the piston-like member. The opposite end of the rod 60 extends beyond the outer end of valve stem 26 and is provided with an externally threaded portion 66 that passes through an opening provided in the removable cap member 47 at the end of the enclosure 44. The rod 60 is held in fixed relation relative to the cap 47, and hence the enclosure 44, by virtue of a pair of nuts 68 mounted on said threaded portion 66, one nut being on each side of the cap 47, so as to hold said cap clamped therebetween.

The nozzle 16 is provided with a coupling block 70 at the free end thereof, said coupling block being adapted to be clamped to the free end of the valve housing 20. The forward face 72 of the coupling block 70 is provided with an outwardly extending flange 74, adapted to fit within a recess 73 of similar size and shape provided in the rear face of the housing 20. A gasket 75 is provided between the flange 74 and the walls of the recess 73 in order to provide for an oil-tight seal between said coupling block 70 and the housing 20.

The coupling block 70 is provided with a longitudinally extending passageway 76 (Figs. 2 and 4), said passageway 76 being connected with the nozzle 16 by a bore 77 that extends transversely of block 70, and interconnects nozzle 16 and passageway 76. At the right-hand end of the coupling block 70, as viewed in Fig. 4, the passageway 76 is reduced in diameter by virtue of an annular shoulder 78 projecting into said passageway. At its left-hand end, the coupling block 70 is provided with a concave cutout portion 79 that is in communication with the passageway 76. A tubular member 80 is movably mounted in the passageway 76, and is in slidable contact with the peripheral surface of the shoulder 78, but spaced from the wall of passageway 76. At its right-hand end, the tubular member 80 is provided with an annular, outwardly extending flange 82 that is adapted to be in sliding contact with the walls of passageway 22 in valve housing 20. At the opposite end of the tubular member 80, the exterior thereof is threaded, and a sleeve member 84 is threadably mounted thereon, said sleeve member being in sliding contact with the wall of passageway 76. The sleeve 84 serves to form, in effect, a flange on the left-hand end of the tubular member 80, and a coil spring 86 which surrounds said tubular member 80, is mounted between the inner edge of sleeve 84 and the inner edge of the shoulder 78. The spring 86 normally tends to move the tubular member 80 towards the left of the coupling block 70, thereby keeping the flange 82 in abutting relation with the right-hand side of shoulder 78. Intermediate the sleeve 84 and the flange 82, the tubular member 80 is provided with a pair of elongated, diametrically located slots 88.

The coupling block 70 is adapted to be tightly clamped against the valve housing 20 by means of a pressure-sensitive bolt 90 that is threaded into the yoke member 18; said bolt is commonly known as a Wilson type and is disclosed in Patent No. 2,670,099. The forward end of the bolt is provided with a convex portion adapted to fit tightly within the concave cut out portion 79 on coupling block 70. The bolt 90 has a passageway 94 extending longitudinally thereof for its entire length, and at the rear end of said bolt the passageway 94 communicates with an enlarged chamber 96 formed in said bolt. The rearmost end of the bolt 90 is provided with an outwardly extending circular flange 98. A cap-like member 100 rotatably surrounds the rear end of the bolt 90, and is in sliding contact with the peripheral edge of the flange 98, said cap member being adapted to rotate relative to the bolt 90 and also slide longitudinally thereof. The cap 100 is provided with a transversely extending handle portion 102.

The interior surface of the transversely extending end portion of the cap 100 is provided with a number of spaced, outwardly projecting studs 106, that are adapted to fit removably within cut out portions of the same size and shape provided in the rearmost end of the bolt member 90 in a clutch-like manner. The forwardmost edge of the cap member 100 is provided with an inwardly turned flange portion 108, said flange 108 being juxtaposed to flange 98 at the end of bolt 90. A coil spring 99 is interposed between the cap 100 and the walls of the chamber 96 in bolt 90, said coil spring bearing, at its opposite ends, against flanges 98 and 108 respectively and tending to move said flanges apart, thereby maintaining studs 106 within cooperating openings provided in the flange 98. Thus rotation of the cap 100 by handle 102, will cause rotation of the bolt 90.

A piston-like member 110 is slidably carried within the chamber 96 and has one face 111 thereof opposite the innermost end of the bore 94. The piston-like member 110 is provided with an O-ring 112 of rubber or the like adapted to prevent the passage of fluid around the edges thereof, to the exterior of the bolt. The rearmost end of the piston member 110 bears against the cap 100, so that if pressure is brought to bear upon the forwardmost face 111 of piston 110 said piston will move rearwardly, thereby pushing the cap 100 rearwardly and thus disengaging the studs 106 from the flange 98. When the studs 106 are disengaged from the flange 98 rotation of the cap 100 by means of handle 102, will not cause rotation of the bolt 90.

In accordance with the applicant's invention the valve 24 is in closed condition upon the initial application of the nozzle coupling block 70 against the rear of the valve housing 20. This position is shown in Figs. 1 and 2, wherein it can be seen that the valve 24 blocks the flow of fluid from the intake pipe 10 through the passageway 22 to the exterior of the valve housing. Further, at this stage of assembly, the spring 48 is under compression between the disc 46 and the gear 42, and therefore tends to move said gear 42 and disc 46 apart. Since the disc 46 is fixedly mounted on valve stem 26 it will remain stationary, and it is the gear 42 that moves on the splined shaft 29, which is a part of the valve stem 26. The gear 42 moves to the left of the assembly, as viewed in Fig. 2, thereby also moving toward the left, the cap member 47 along with the rod member 60 fixedly connected thereto. When the rod 60 moves towards the left the piston-like member 62 attached to the innermost end thereof, will also move to the left, since member 62 and rod 60 are fixedly attached to one another.

It is pointed out that the structure described above maintains the gears 42 and 56, disengaged prior to the tightening of the bolt 90 against the block 70. Before bolt 90 is tightened against block 70, the gears 42 and 56 are disengaged and hence the rotation of handle 58 and gear 56 can not cause rotation of the valve stem 26. At this stage it is obviously impossible for the valve 20 to be accidently opened by rotation of the handle 58.

At the preliminary stage of assembly as shown in Figs. 1 and 2, the tubular member 80 slidably mounted in the nozzle connecting block 70 has been moved as far to the left as possible by the action of spring 86 upon the sleeve 84 on the tubular member 80 and the inwardly-directed shoulder 78 in the passageway 76. The tubular member 80 can not be moved completely out of the connecting block 70 because the outwardly extending flange 82 at the right-hand end thereof is adapted to abut the inwardly directed shoulder 78 on the journal block 70, in the manner shown in Fig. 2. The connecting block 70 is locked tightly against the valve housing 20 by tightening the bolt 90 against the rear surface thereof, the convex end 92 of the bolt 90 fitting within the concave portion 79 of the block 70.

Prior to the presence of high pressure fluid within the chamber 96 of the bolt 90, as is the case at the stage of assembly shown in Figs. 1 and 2, the cap 100 of the bolt is interlocked with the bolt itself; since the studs 106 on the cap 100 are interlocked with corresponding openings in the bolt end portion. As the bolt is rotated it moves towards the atomizer connecting block 70, and in moving toward said block the forward end 92 of the bolt 90 contacts the rearward end of the tubular member 80 moving the same towards the right as the bolt itself moves toward the right. As the tubular member 80 moves toward the right, the right-hand end thereof, including flange 82, contacts the rearward surface of the piston-like member 62 moving the same towards the right which in turn moves rod 60 in the same direction. Since rod 60 is fixedly attached to the hollow enclosure 44, which in turn is fixedly attached to gear 42, the right-hand movement of the rod 60 will cause right-hand movement of the gear 42 on the splined portion 29 of the valve stem 26. By virtue of the proper dimensioning of the elements, when the bolt 90 is completely tightened against the atomizer coupling block 70 in the manner shown in Figs. 3 and 4, the rod 60 has moved far enough towards the right to move the gear 42 on the splined portion 29 of valve stem 26, so that said gear will be enmeshed with gear 56. At this state of assembly, the nozzle 16, which is already within the burner enclosure 14, is securely connected to the rear, or free end of the valve housing 20 so that it is impossible for oil or the like to escape from the rear end of the housing 20. The gasket 73 and O-ring 112 respectively, prevent the escape of fluid from the joint between the coupling block 70 and the housing 20, and around the piston 110 respectively.

When the coupling block 70 is tightly clamped to the valve 20, and the gears 46 and 52 are enmeshed, the valve 20 is in condition to be opened. The rotation of handle 58 in a suitable direction in turn rotates gears 56 and 42. The rotation of gear 42 in the proper direction causes the valve stem 26 to rotate, and by virtue of its threaded connection with the stationary sleeve 30 said valve stem moves towards the right of the housing, as viewed in Figs. 2 through 4. When the valve is open, as shown in Fig. 3, oil or the like may flow through intake pipe 10 past the valve member 24 through the holes 64 provided in the piston-like member 62, and thence into the tubular member 80. A portion of the oil, under pressure, enters bolt 90 through the bore 94 contained therein and comes to bear against the right-hand face 111 of the piston 110 contained within the handle of the bolt. The pressure of the oil against the piston 110 moves the same toward the left, as viewed in Fig. 4, which in turn moves cap member 100 to the left, thereby disengaging said cap member from the flange 98. Thus, it can be seen that, when oil, under pressure, is contained within the bolt 90, it is impossible for the bolt handle 102 to be turned thereby disengaging the nozzle coupling block 70 from the valve housing 20. The oil of course flows through the slots 88 in the tubular member 80, into the space between tubular member 80 and the block 70, through passageway 77, into the nozzle 16, and thence into the burner 14.

It is pointed out that as long as the valve 24 is open and oil, under pressure, is within the passageway 94 of bolt 90, said bolt cannot be rotated and hence the nozzle coupling block 70 cannot be disconnected from the valve housing 20. In order to disconnect the assembly it is first necessary to close the valve 24 by rotation of valve handle 58 in a suitable direction. When valve 24 is closed the oil pressure within the bolt is relieved and the cap member 100 moves toward the right, becoming reengaged with the bolt flange 98, thereby making it possible for said bolt to be rotated, by handle 102, in such a direction as to release the coupling block 70 from the valve housing 20. As the bolt is retracted from the block 70 the tubular member 80, within said block, moves toward the left under the influence of spring 86, thereby allowing the rod 60 to move toward the left under the influence of spring 48 that acts between gear 42 and the disc 46; thus gear 42 will move toward the left and become disengaged from gear 56. It is emphasized that gear 42 can be disengaged from gear 56, only after the valve 24 is closed, thereby relieving the pressure in the bolt 90. Once the valve 24 is closed and the gear 42 is disengaged from the gear 56, it is impossible to once again open said valve 24 until a nozzle connecting block 70 has been tightly clamped against the valve housing 20 by the action of the bolt 90 in the manner described above.

Obviously many modifications and variations of the present invention are possible in the light of the above teachings. It is therefore to be understood that within the scope of the appended claims the invention may be practiced otherwise than as specifically described.

What is claimed is:

1. A safety shutoff device for a fluid supply system comprising a valve assembly having a fluid inlet and a fluid outlet, a movable valve element maintaining said outlet in closed condition, valve actuating means associated with the exterior of said valve assembly for moving said valve element out of outlet closing position; a pipe and coupling block adapted to be removably clamped to the valve assembly in alignment with said outlet, a clamping member adapted to clamp said coupling block to said valve assembly, and means for rendering the actuating means inoperative comprising a shiftable member, a resilient member acting upon the shiftable member to move the latter to an inoperative position; said shutoff device further comprising, a slidably mounted member within said valve assembly and connected to said shiftable member, slidable means associated with said coupling block and adapted to contact the slidable member in the valve assembly to move the same, and means associated with said clamping member adapted to move said slidable means in the coupling block, whereby the shiftable member is moved relative to the valve assembly thereby moving the actuating means to operative position.

2. A safety shut-off device for a fluid supply system comprising, a valve assembly having a fluid inlet and a fluid outlet, a pipe end coupling block, a clamping member adapted to removably clamp said coupling block to said valve assembly, a fluid passageway provided within said coupling block, said passageway being in alignment with the fluid outlet; a valve element within said valve assembly for selectively opening and closing said fluid outlet, means on the exterior of said valve assembly for actuating said valve element, said actuating means comprising a driven member and a driving member, means for normally maintaining said members disengaged from one another, a first slideable member, said member being mounted within said valve assembly and adapted to move said driven member and driving member into engagement with one another, a second slideable member, said member being mounted within the fluid passageway in said coupling block, said second slideable member being juxtaposed to the slideable member within the valve assembly when said coupling block is clamped to the valve assembly, means on said clamping member adapted to shift the second slideable member toward said first slideable member, as said block is being clamped to the valve assembly, said second slideable member being adapted to bear against the first slideable member and move the same forwardly whereby clamping of the coupling block to the valve assembly results in movement of the slideable members within the coupling block and valve assembly respectively, thereby moving said driven member and driving member into engagement with one another.

3. A safety shutoff device for a fluid supply system as set forth in claim 2 wherein, said clamping means includes a pressure sensitive bolt member having a passageway extending longitudinally thereof, said passageway having a piston at one end thereof, for rendering said bolt inoperative upon the presence of fluid under pressure within the passageway, the passageway within the bolt being adapted to communicate with the passageway in the coupling block when said block is clamped to the valve assembly, whereby fluid from said valve assembly may pass through the coupling block and into the pressure sensitive bolt member to move said piston, thereby rendering said bolt inoperative when the valve outlet is open, which in turn renders the clamping means inoperative for removing the coupling block from the valve assembly while said fluid outlet is open.

References Cited in the file of this patent
UNITED STATES PATENTS

| 2,462,512 | Krone | Feb. 22, 1949 |
| 2,543,589 | Newcomb | Feb. 27, 1951 |